(12) United States Patent
Szigeti et al.

(10) Patent No.: US 10,904,115 B2
(45) Date of Patent: Jan. 26, 2021

(54) ANONYMOUS INTEGRATION OF CLOUD BASED APPLICATIONS AND ON-PREMISE NETWORK ANALYTICS

(71) Applicant: Cisco Technology, Inc., San Jose, CA (US)

(72) Inventors: Thomas Szigeti, Vancouver (CA); Stefano Giorcelli, Valbonne (FR); Guy Keinan, Kfar-Saba (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 9 days.

(21) Appl. No.: 16/544,617

(22) Filed: Aug. 19, 2019

(65) Prior Publication Data

US 2020/0162351 A1 May 21, 2020

Related U.S. Application Data

(60) Provisional application No. 62/768,243, filed on Nov. 16, 2018.

(51) Int. Cl.
*H04L 12/26* (2006.01)
*G06F 21/62* (2013.01)
(Continued)

(52) U.S. Cl.
CPC ............ *H04L 43/04* (2013.01); *G06F 9/5072* (2013.01); *G06F 21/6245* (2013.01); *H04L 41/14* (2013.01); *H04L 43/08* (2013.01)

(58) Field of Classification Search
CPC ......... H04L 41/14; H04L 43/04; H04L 43/08; G06F 21/6245; G06F 21/6254; G06F 9/5072
See application file for complete search history.

(56) References Cited

U.S. PATENT DOCUMENTS 8,578,076 B2 11/2013 van der Linden et al.
9,253,054 B2 * 2/2016 Maturana ........... G05B 23/0264
(Continued)

OTHER PUBLICATIONS

"The Cisco Digital Network Architecture Vision—An Overview," Cisco Systems, Inc., 2016, 26 pages.
(Continued)

*Primary Examiner* — Michael C Lai
(74) *Attorney, Agent, or Firm* — Polsinelli PC

(57) ABSTRACT

The present disclosure provides a method of exchanging on-premise network analytics and cloud-based application analytics between an enterprise network and a cloud-based application without exchanging any personally identifiable information about the end users and devices involved in a communication session conducted over the enterprise network and using the cloud-based application. In one aspect, a method includes receiving, at a controller of a network, first analytics data, the first analytics data being embedded with a watermark, the first analytics data excluding personally identifiable information associated with end points of a communication session using a cloud-based application; receiving second analytics data from one or more components of the network, the second analytics data including the watermark; correlating the first analytics data and the second analytics data using the watermark to yield correlated data; and performing network analysis and troubleshooting using the correlated data.

20 Claims, 7 Drawing Sheets

(51) Int. Cl.
    *G06F 9/50*       (2006.01)
    *H04L 12/24*    (2006.01)

(56) References Cited

U.S. PATENT DOCUMENTS

| | | | |
|---|---|---|---|
| 9,805,106 B2 | 10/2017 | McErlean et al. | |
| 10,560,520 B2 * | 2/2020 | Wang | H04L 67/02 |
| 2013/0117422 A1 * | 5/2013 | Nelson | H04L 67/34 709/221 |
| 2020/0026574 A1 * | 1/2020 | Nelson | H04L 67/34 |

OTHER PUBLICATIONS

Maturana, Francisco, P., et al., "Merging Agents and Cloud Services in Industrial Applications," Aug. 19, 2014, 9 pages.

* cited by examiner

ANONYMOUS INTEGRATION OF CLOUD BASED APPLICATIONS AND ON-PREMISE NETWORK ANALYTICS

RELATED APPLICATIONS DATA

This application claims priority to U.S. Provisional Application No. 62/768,243 filed on Nov. 16, 2018, the entire content of which is incorporated herein by reference.

TECHNICAL FIELD

The subject matter of this disclosure relates in general to the field of computer networking, and more particularly, to systems and methods for anonymous correlation of cloud based applications and on-premise network analytics data to improve user experience in utilizing cloud-based applications.

BACKGROUND

When two or more end user devices establish a cloud-based communication session (e.g., a video-based collaboration session), multiple variables factor into end users' experiences during the communication session. One set of such variables can include hardware, operating system and software application performances on end user devices, routers and switches as well as wireless/wired performances at local networks, edges, cores and interconnects of an enterprise and service provider network. Indicators of such performances may be referred to as on-premise network analytics data.

Another set of such variables can include network, storage, computing and coding performances measured by a cloud application provider that provides the application for the cloud-based communication session. Indicators of such performances may be referred to as application analytics data.

Troubleshooting a problem with a communication session is a complex technical problem given the number of disjoint and dispersed parties involved (e.g., end devices, enterprise network and cloud application provider) and a lack of comprehensive knowledge and a complete overall picture of performance. This problem can be remedied by integrating on-premise network analytics data with cloud-based application analytics data.

This integration carries an inherent risk of exposing personal identifying information of users and end user devices, such as usernames, IP and MAC addresses, etc., which are used to correlate the application and the on premise network analytics data. Many enterprise networks are at best reluctant and at worst restricted from sharing such personal identifying information with application providers due to security and/or regulatory concerns and constraints.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
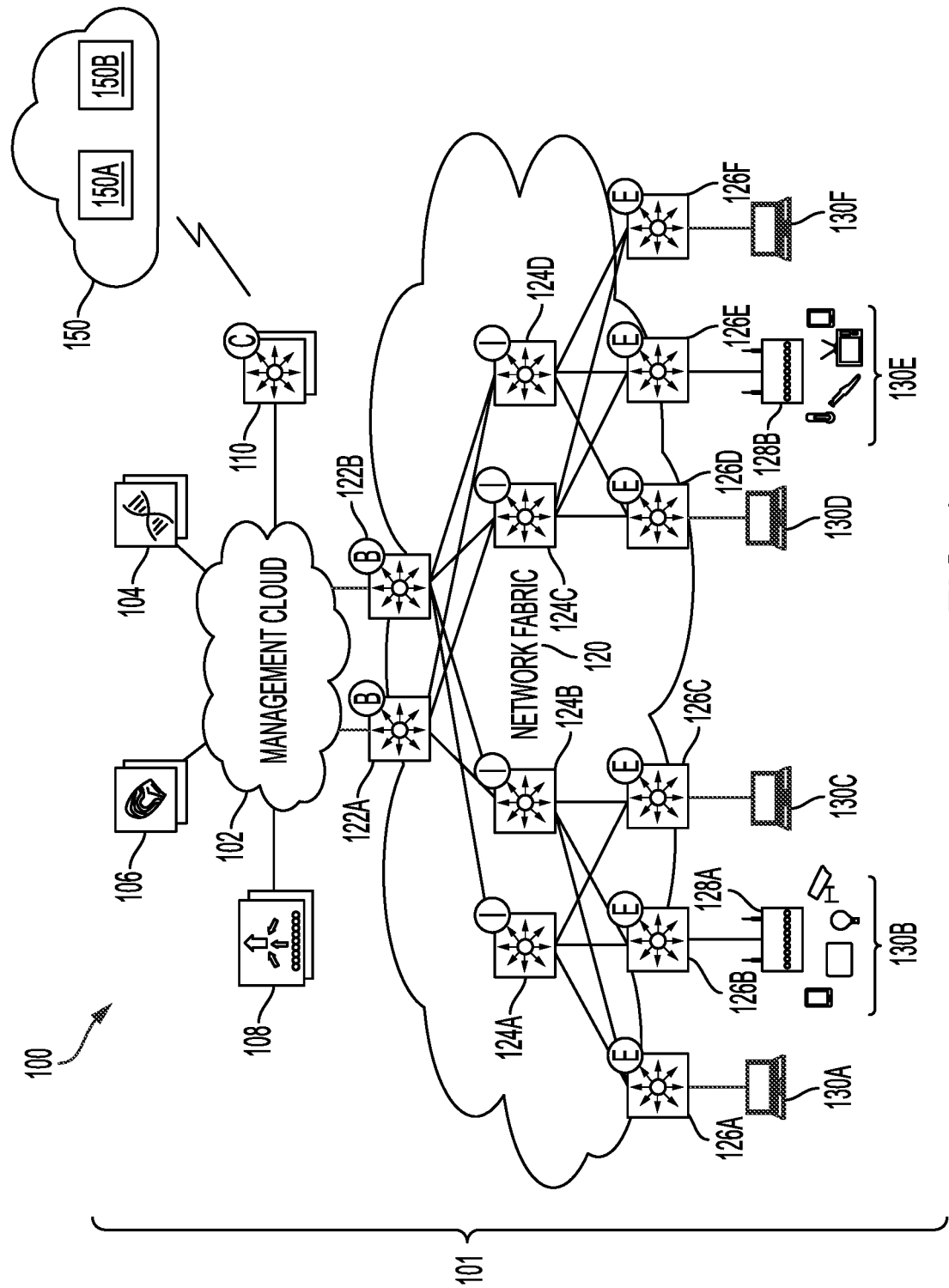
FIG. 1 illustrates an example setting of a cloud-based application and a physical topology of an enterprise network, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure provides a unique method of exchanging on-premise network analytics and cloud-based application analytics between, for example, an enterprise network and a cloud-based application provider without exchange of any personally identifiable information about the end users and end user devices involved in a communication session conducted over the enterprise network that utilizes the cloud-based application.

Data packets for the communication session may initiate from one end user to be transmitted to another end user of the communication session, where the communication session may utilize cloud-based collaborative applications such as an online/cloud-based video conferencing application. As data packets for such communications session traverse an enterprise network, software running on components of the enterprise network can detect the watermarks and transmit them, together with on-premise network analytics, to a network controller, a non-limiting example of which can be a Cisco Digital Network Architecture Center (DNA-C) controller of the enterprise network. Hereinafter, such controller can also be referred to as an on-premise network controller and/or an on-premise network analytics application. Accordingly, a network controller receives on-premise network analytics associated with the flow identifier. Furthermore, network controller may also receive telemetry data from the cloud application provider for per-user/per-call application analytics for the communication session, together with the flow identifier. Accordingly, network controller receives application analytics and on-premise analytics data without exchange of any personally identifiable information about the users and end user devices of the communication session.

In response, network controller can correlate the on-premise network analytics with the cloud-based application analytics using the flow identifier and perform a comprehensive analysis of performance for a communication session and/or remedy any detected problem or user experience shortcomings.

In one aspect of the present disclosure, a method includes receiving, at a controller of a network, first analytics data, the first analytics data being embedded with a watermark, the first analytics data excluding personally identifiable information associated with end points of a communication session using a cloud-based application; receiving, at the controller, second analytics data from one or more components of the network, the second analytics data including the watermark; correlating, by the controller, the first analytics data and the second analytics data using the watermark to yield correlated data; and performing, by the controller, network analysis and troubleshooting using the correlated data.

In one aspect of the present disclosure, a controller includes a memory having computer-readable instructions stored therein and one or more processors configured to execute the computer-readable instructions to receive first analytics data, the first analytics data being embedded with a watermark, the first analytics data excluding personally identifiable information associated with end points of a communication session using a cloud-based application; receive second analytics data from one or more components of the network, the second analytics data including the watermark; correlate the first analytics data and the second analytics data using the watermark to yield correlated data; and perform network analysis and troubleshooting using the correlated data.

In one aspect of the present disclosure, one or more non-transitory computer-readable media have computer-readable instruction stored thereon, which when executed by one or more processors of a controller of a network, cause the one or more processors to receive first analytics data, the first analytics data being embedded with a watermark, the first analytics data excluding personally identifiable information associated with end points of a communication session using a cloud-based application; receive second analytics data from one or more components of the network, the second analytics data including the watermark; correlate the first analytics data and the second analytics data using the watermark to yield correlated data; and perform network analysis and troubleshooting using the correlated data.

DETAILED DESCRIPTION

FIG. 1 illustrates an example setting of a cloud-based application and a physical topology of an enterprise network, according to one aspect of the present disclosure;

FIG. 1 illustrates an example setting 100 that includes a physical topology of an enterprise network 101 for providing intent-based networking and a cloud-base application 150 accessible via enterprise network 101. It should be understood that, for the enterprise network 101 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 101 can include any number or type of resources, which can be accessed and utilized by endpoints or network devices. The illustrations and examples provided herein are for clarity and simplicity.

In this example, the enterprise network 101 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other example embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some example embodiments, one or more Cisco Digital Network Architecture (Cisco DNA™) appliances can operate as the network controller appliance(s) 104 and may be referred to as a network controller 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some example embodiments, the AAA appliance(s) 106 can utilize Remote Authentication Dial-In User Service (RADIUS) or Diameter to communicate with devices and applications. In some example embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some example embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some example embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other example embodiments, the fabric control plane node(s) 110 may be co-located with the network fabric 120. In example embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment.

In some example embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some example embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 101 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some example embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some example embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

As noted above, setting 100 also includes cloud based applications 150, which may be accessed/used by one or more users via one or more of end points 130A, 130B, 130C, 130D, 130E and 130F.

Cloud based applications 150 can include a number of different applications such as application 150A and application 150B. A non-limiting example of application 150A or 150B can be a multi-media collaborative application for conducting remote audio/video based collaboration sessions such as Cisco's WebEx application or Cisco's WebEx Teams application. However, such applications can include any other cloud-based application utilized by users via their respective end points.

Cloud-based software applications 150A and 150B can be executed on one or more cloud based servers. Furthermore, each such cloud-based application 150A or 150B can communicate using known or to be developed methods with network controller 104 of enterprise network 101 to provide, anonymously, information and analytics associated with communication sessions (collaborative sessions) established between various end points using application 150A and/or application 150B.

In one example, anonymous communication (without revealing user personally identifiable information), includes in part a process of watermarking statistics collected on a communication session by a cloud-based application to hide/mask such personally identifiable information before sharing collected statistics with network controller 104. This process will be described below with reference to FIG. 2

Figure 2:
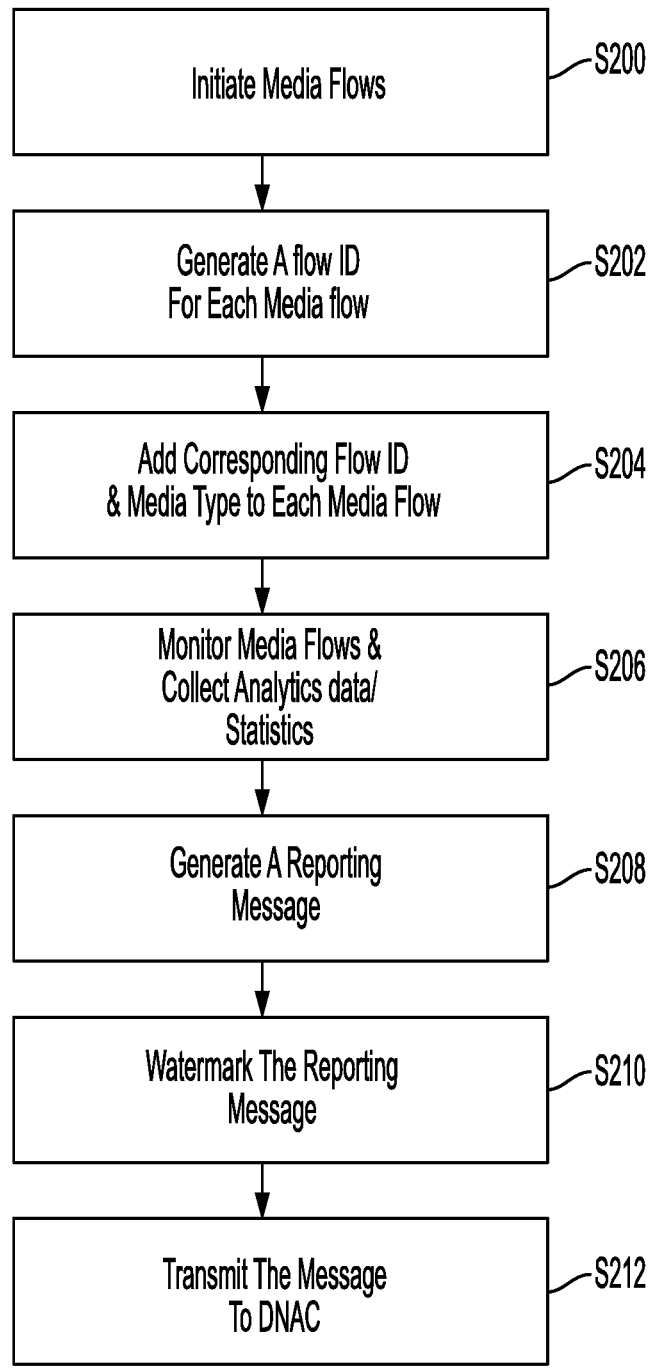
FIG. 2 illustrates a method of watermarking media flows associated with using a cloud-based application, according to one aspect of the present disclosure.

FIG. 2 illustrates a method of watermarking media flows associated with using a cloud-based application, according to one aspect of the present disclosure. In describing FIG. 2, an assumption is made that at least two end points from end points 130A, 130B, 130C, 130D, 130E and 130F are currently participating in a communication session utilizing services provided by cloud-based application 150A, an example of which can be video/audio based collaboration services. For purposes of describing example embodiments, an assumption is made that such communication session is between end points 130A and 130B. FIG. 2 will be described from perspective of application 150A (or an analytics platform associated with application 150A). Similarly, FIG. 2 can be implemented by application 150B (or an analytics platform associated with application 150B).

At S200 and after a communication session has been initiated between end points 130A and 130B, application 150A initiates media flows between end points 130A and 130B.

At S202, application 150A generates a flow ID for each media flow. In one example, the flow ID for each media flow can be a randomly generated number or identifier.

At S204, application 150A adds the flow ID and media type(s) (flow type(s)) to each media flow destined for end point 130A or 130B. In one example, application 150A adds the flow ID and media types (e.g., audio, video-main, video-content, probe for connection check, etc.) into a Session Traversal Utilities for NAT (STUN) messages that initiate each media flow. Accordingly, application 150A watermarks media flows.

Figure 3:
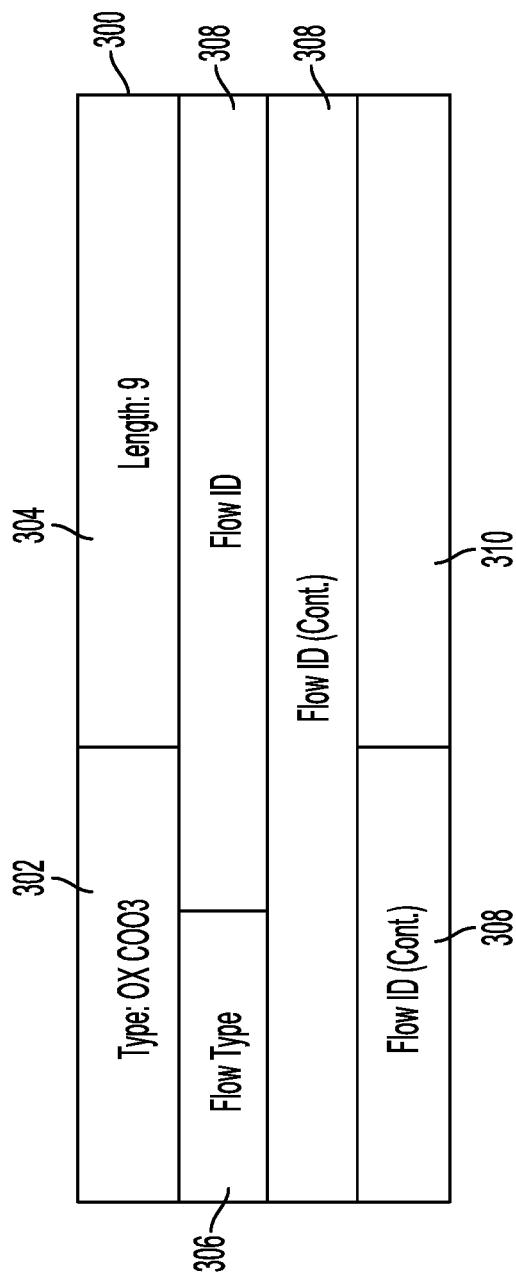
FIG. 3 illustrates an example structure of a media flow with watermarking, according to one aspect of the present disclosure.

FIG. 3 illustrates an example structure of a media flow with watermarking, according to one aspect of the present disclosure. As shown in FIG. 3, STUN message 300 includes type information 302 and length information 304, as known. STUN message 300 further includes flow type information that can have an exemplary size of 1 byte and can be a single digit (e.g., 0, 1, 2 or 7, which have specific definitions attached thereto). For example, flow type 0 indicates that the media flow is audio, flow type 1 indicates that media flow is video (main), flow type 2 indicates that media flow is video (content) and flow type 7 indicates that media flow is a probe for checking connectivity.

STUN 300 further includes flow ID information 308, which as noted above, can be a randomly generated number and can have an exemplary size of 2 bytes, 8 bytes, etc. Flow ID information can have the same value as STUN username, which can be a concatenation of sender and receiver ufrag (e.g., at least 4 ice-characters each (i.e., 24+24=48 bits of randomness). In one example, Flow ID can have a size of up to 12 bytes.

STUN message 300 can also include padding 310.

Referring back to FIG. 2, at S206, application 150A monitors media flows and the communication session and collects various types of analytics and statistics for the communication session between end point 130A and 130B. Such statistics can include per-user/per-call quality information, packet rate, packet drop rate, etc.

At S208, application 150A generates a reporting message that includes the analytics and the statistics collected.

At S210, application 150A watermarks the message generated at S208 with flow ID and at S212, transmits the watermarked reporting message to network controller 104. S210 and S212 will be described in more detail below with reference to FIG. 5.

By performing the method of FIG. 2, information and cloud-based analytics data for a given communication session are stripped of any personally identifiable information and transmitted to a controller such as network controller 104 for correlation with on-premise analytics data, which will be further described below.

With cloud-based application analytics being anonymously transmitted from application 150A to network controller 104, the disclosure now turns to description of example embodiments for correlating received cloud-based application analytics with on-premise network analytics available to network controller 104.

Prior to describing example correlation methods with reference to FIG. 4, it is noted that various components of enterprise network 101 such as routers and switches (e.g. nodes 122, 124 and/or 126 in FIG. 1) and LAN controllers such as WLCs 108 may have installed thereon, intelligent network classifications software such as Cisco's Network Based Application Recognition (NBAR) software, which as will be described below, can detect, in any packet passing therethrough (on its path toward or from end points 130A and 130B during example communication session described above), flow ID generated and embedded therein.

Figure 4:
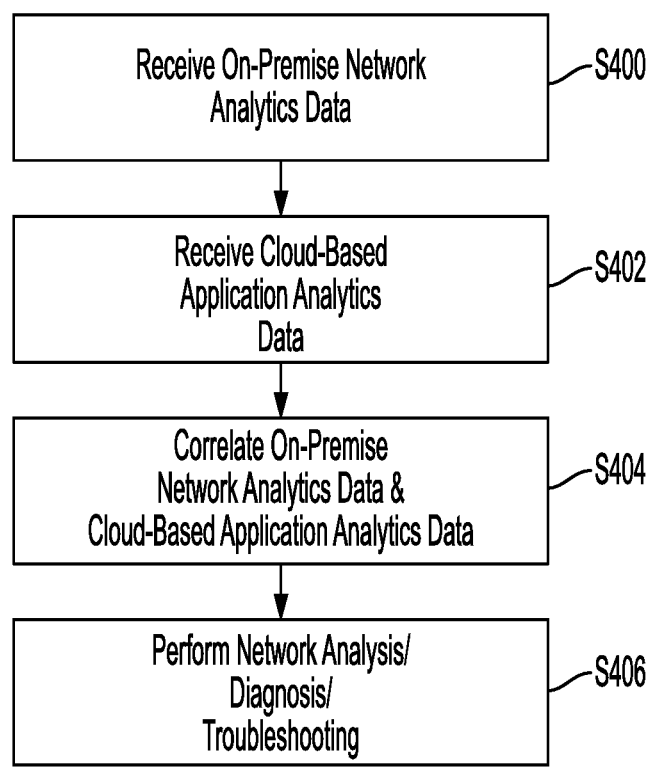
FIG. 4 illustrates an example method of anonymously correlating cloud-based application and on-premise network analytics, according to an aspect of the present disclosure.

FIG. 4 illustrates an example method of anonymously correlating cloud-based application and on-premise network analytics, according to an aspect of the present disclosure. While FIG. 4 will be described from the perspective of network controller 104, it should be understood that network controller 104 can have one or more memories having computer-readable instructions stored thereon, which when executed by one or more associated processors (which will be further described with reference to FIG. 7), enable network controller 104 to perform the steps of FIG. 4.

AT S400, network controller 104 receives on-premise network analytics data (network analytics messages). In one example, network controller 104 receives, from one or more network components of enterprise network 101 (e.g., routers and switches (i.e., nodes 122, 124 and/or 126 in FIG. 1) and wireless LAN controllers (i.e., WLCs 108), details of media flows passing through such network components via network telemetry protocols such as Flexible Net Flow (FNF). These media flows can be data packets exchanged between end points 130A and 130B during a communication session that is using cloud-based application 150A and are watermarked (with flow IDs and media/flow types) by cloud-based application 150A.

At S402, network controller 104 receives cloud-based application analytics data (cloud-based application analytics messages). In one example, network controller 104 receives one or more reporting messages from cloud-based application (e.g., application 150A), created and transmitted per S210 and S212 of FIG. 2. The reception of reporting messages may be based on an Application Programming Interface (API) exchange, which will be described in more detail with reference to FIG. 5.

In one example, the order of S400 and S402 may be reversed such that network controller 104 performs S402 first followed by S400. Also, cloud-based application analytics data and on-premise network analytics data may also be referred to as first analytics data and second analytics data, respectively.

Figure 5:
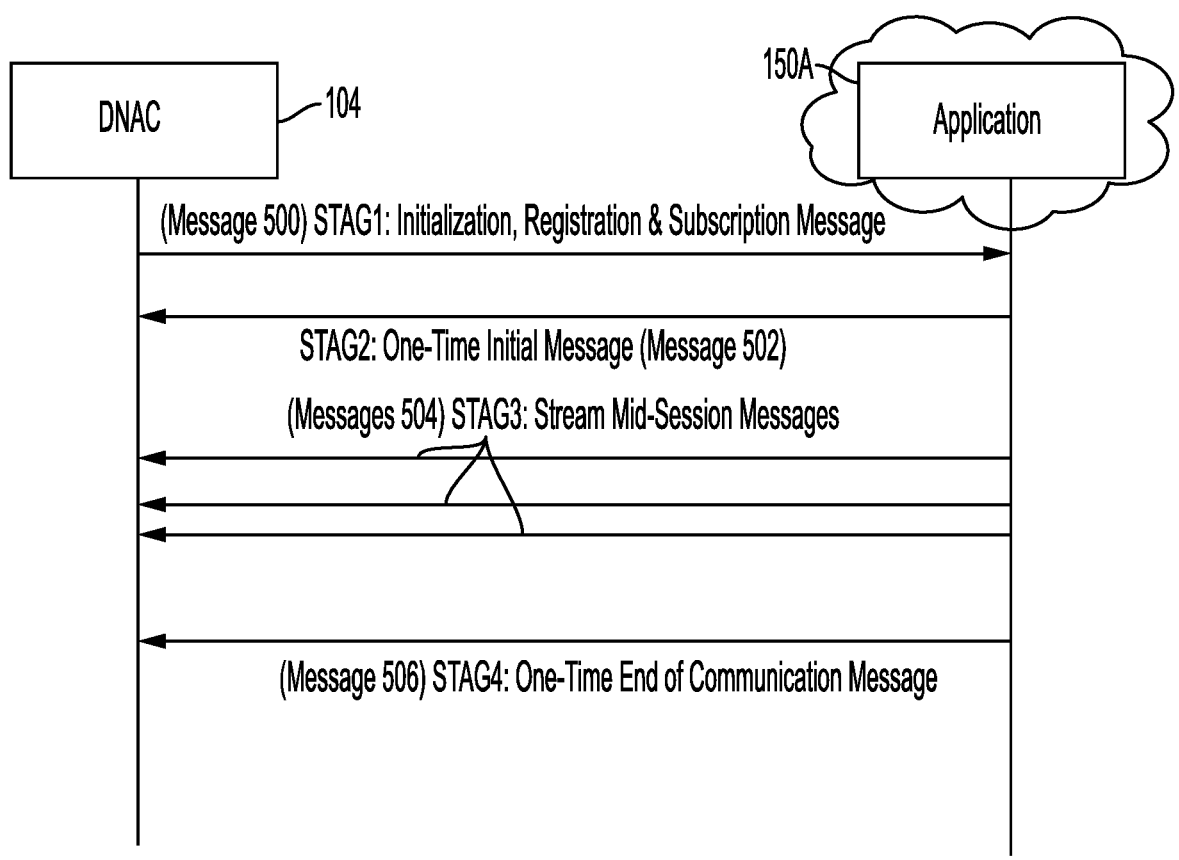
FIG. 5 illustrates an example API exchange of reporting messages between an on-premises network controller and a cloud-based application, according to an aspect of the present disclosure.

FIG. 5 illustrates an example API exchange of reporting messages between n on-premises network controller and a cloud-based application, according to an aspect of the present disclosure. As shown in FIG. 5, an example API exchange can include the following stages. At stage 1 (message 500), an Initialization, Registration and Subscription message may be sent from network controller 104 to cloud-based application 150A (or an analytics platform associated with cloud-based application 150A).

This Initialization, Registration and Subscription message may be a one-time push from network controller 104 to cloud-based application 150A. An example purpose of this message can be to securely register network controller 104 with cloud-based application 150A and can specify (include) information regarding organization of interest, events of interest, metrics of interest to network controller 104, etc.

At stage 2 (message 502) and at the beginning of a communication session between end points 130A and 130B using cloud-based application 150A, cloud-based application 150A pushes a single (1 time) initial message to network controller 104, where the message includes a corresponding flow ID, as described above, media type(s) for the communication session, data rates, etc.

At stage 3 (messages 504) and while the communication session is ongoing (mid-session), cloud-based application 150A streams multiple messages to network controller 104, each of which includes the corresponding flow ID, quality thresholds (e.g., Audio: Good/Fair/Poor), specific key performance indicator (KPI) metrics, etc.

At stage 4 (message 506) and at the end of the communication session, cloud-based application 150A, sends a single (1 time) message to network controller 104 that includes information such as corresponding flow ID, meeting information, start time/end time of the communication session, meeting join-time, media type(s), media KPI metrics, etc.

Referring back to FIG. 4, network controller 104 now both on-premise network analytics data as well as cloud-based application analytics data (both network analytics and cloud-based application analytics messages). At S404, network controller 104 correlates on-premise analytics data and the cloud-based application analytics data, where cloud-based application analytics data does not include any personally identifiable information that can be used to identify users and/or end terminals participating in the communication session.

Correlation process of S404 will be described in detail with reference to FIG. 6.

Figure 6:
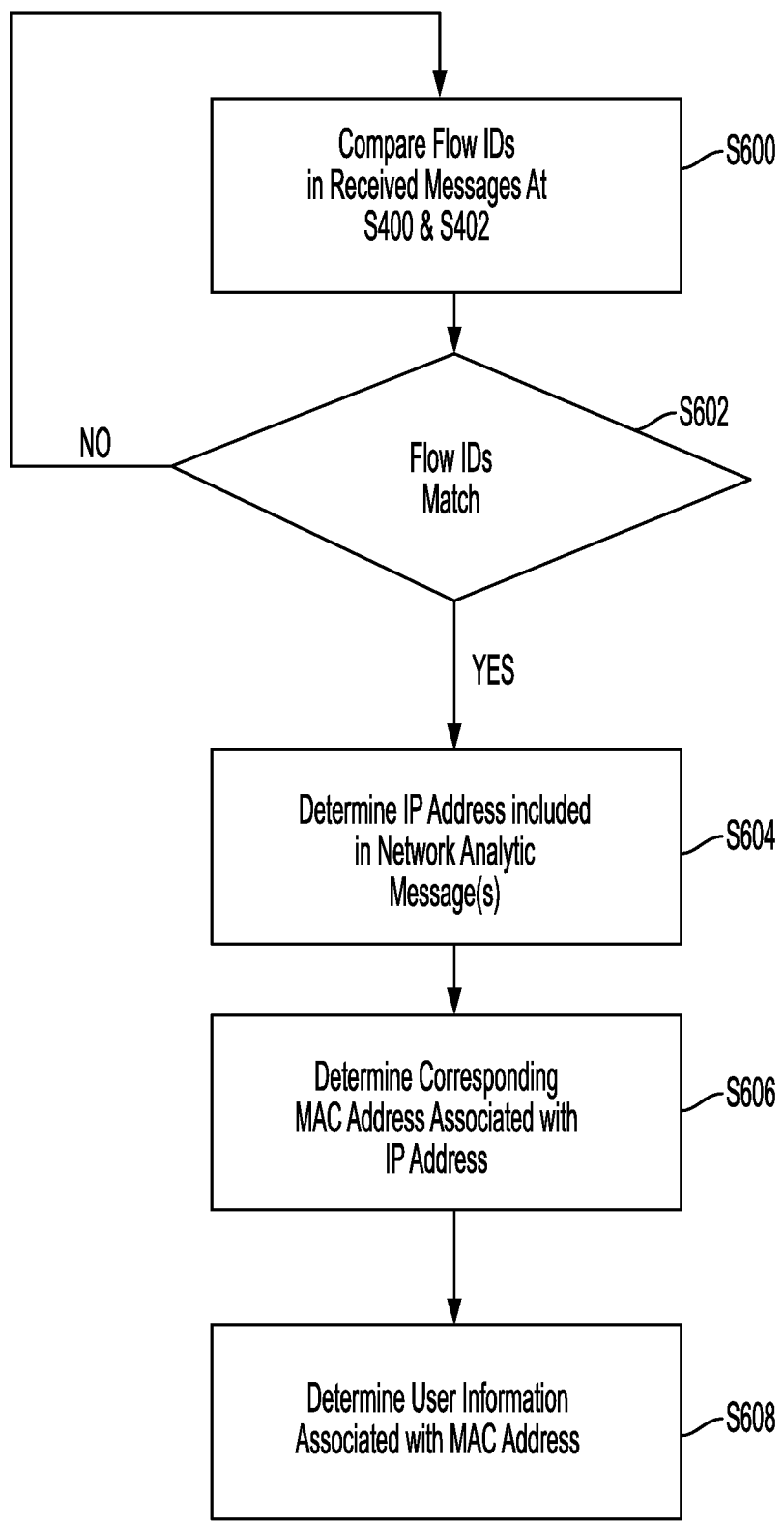
FIG. 6 illustrates a correlation process for correlation on-premise network and cloud-based application analytics data, according to an aspect of the present disclosure.

FIG. 6 illustrates a correlation process for correlation on-premise network and cloud-based application analytics data, according to an aspect of the present disclosure. While FIG. 6 will be described from the perspective of network controller 104, it should be understood that network controller 104 can have one or more memories having computer-readable instructions stored thereon, which when executed by one or more associated processors (which will be further described with reference to FIG. 7), enable network controller 104 to perform the steps of FIG. 4.

At S600, network controller 104 compares flow IDs included in on-premise network analytics data (received at S400) and cloud-based application analytics data (received at S402). The comparison may be performed on any pair of data packets received at network controller 104, where one data packet of the pair includes on-premise network analytics data and the other includes cloud-based application analytics data. In another example, network controller 104 may receive various data packets from both application 150A and various components of enterprise network 101 for a given communication session and perform the comparison after receiving an indication that the communication session has ended.

At S602, network controller 104 determines if flow IDs included in on-premise network analytics data and cloud-based application analytics data match. If not, the process reverts back to S600 and network 104 repeats S600 and S602 until a match is found.

Once a match is found at S602, at S604, network controller 104 determines from information included in packets received at S400 from network components (FNF reports) a corresponding IP address of end point 130A and/or end point 130B.

At S606 and using the corresponding IP address retrieved from the FNF report, network controller 104 determines MAC address of the end point 130A and/or end point 130B. In one example, and using the corresponding IP address determined at S602, network controller 104 may send an inquiry to a Dynamic Host Configuration Protocol (DHCP) or Internet Protocol Address Management (IPAM) server where MAC addresses associated with assigned IP addresses are stored.

At S608 and based on the MAC address determined at S606, network controller 104 determines user information (identification) associated with the MAC address. In one example, network controller 104 may send an inquiry to a network authentication server that may be part of or external to enterprise network 101 (may also be referred to as Identity Services Engine (ISE)), which stores associations between MAC addresses and user information.

Referring back to FIG. 4 and after the correlation process is performed, at S406, network controller 104 can perform network analysis and troubleshooting using the on-premise network analytics and the application analytics according to any known or to be developed method.

By performing the process described above with reference to FIGS. 1-6, all user specific information, IP addresses and MAC addressed are leveraged within enterprise network 101 for diagnosis and support purposes without ever leaving enterprise network 101, which as noted above is a task that enterprise network service providers are reluctant to do or are prohibited from doing so.

While the process above has been described from the perspective of network controller 104, where network controller 104 receives anonymous on-premise network and cloud-based application analytics data to perform correlation, the present disclosure is not limited thereto and the same process can be performed by an analytics platform associated with application 150A and/or 150B, where on-premise network analytics data are watermarked at network controller 104 and transmitted to such cloud analytics platform associated with cloud-based application for performing the correlation process described above.

With above description, the disclosure now turns to describing example device/system structures that can be used as network controller 104, application 150A (and/or an analytics platform associated therewith), various switches, routers, WLCs of enterprise network 101 and/or any one of end points 130A, 130B, 130C, 130D, 130E and 130F.

Figure 7:
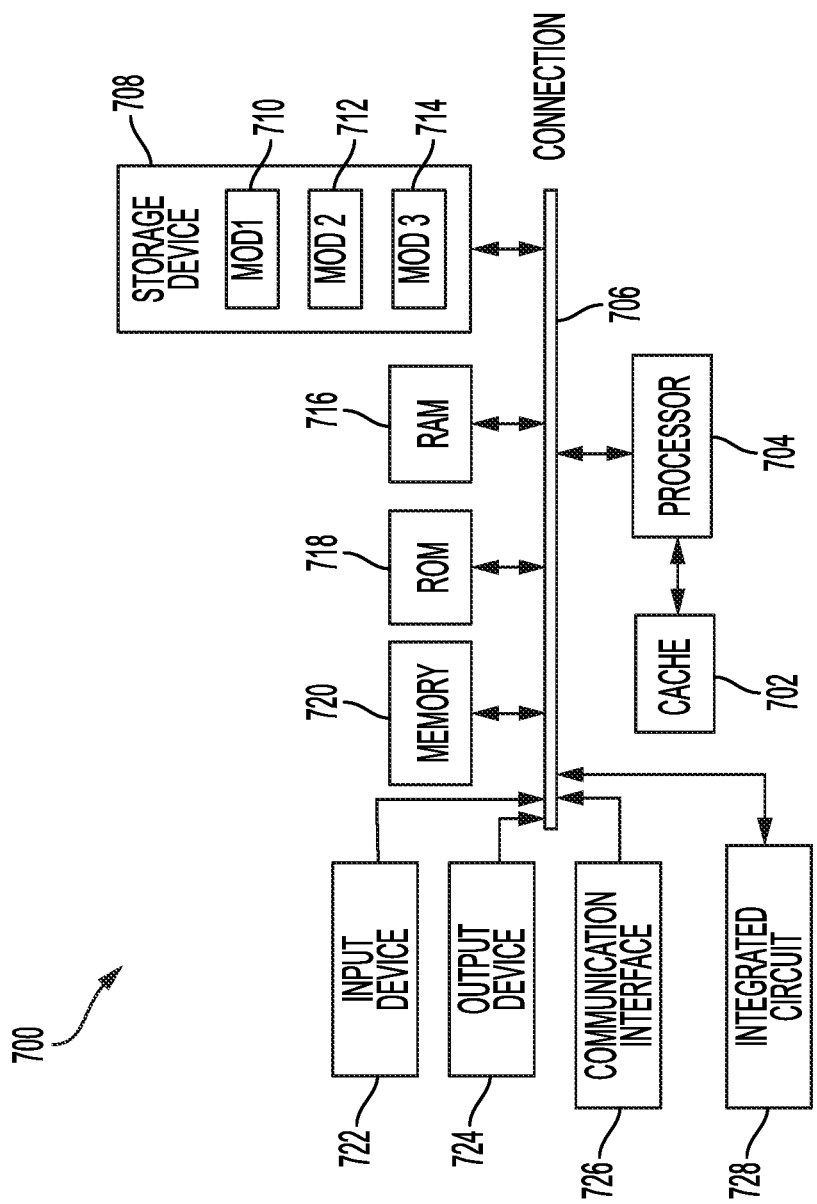
FIG. 7 illustrates an example system including various hardware computing components, according to an aspect of the present disclosure.

FIG. 7 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 7 illustrates system bus computing system architecture (system) 700 wherein the components of the system are in electrical communication with each other using a connection 706. Exemplary system 700 includes a cache 702 and a processing unit (CPU or processor) 704 and a system connection 706 that couples various system components including the system memory 720, such as read only memory (ROM) 718 and random access memory (RAM) 716, to the processor 704. System 700 can include a cache of high-speed memory connected directly with, in close proximity to, or integrated as part of the processor 704. System 700 can copy data from the memory 720 and/or the storage device 708 to the cache 702 for quick access by the processor 704. In this way, the cache can provide a performance boost that avoids processor 704 delays while waiting for data. These and other modules can control or be configured to control the processor 704 to perform various actions. Other system memory 720 may be available for use as well. The memory 720 can include multiple different types of memory with different performance characteristics. The processor 704 can include any general purpose processor and a service component, such as service 1 710, service 2 712, and service 3 714 stored in storage device 708, configured to control the processor 704 as well as a special-purpose processor where software instructions are incorporated into the actual processor design. The processor 704 may essentially be a completely self-contained computing system, containing multiple cores or processors, a bus, memory controller, cache, etc. A multi-core processor may be symmetric or asymmetric.

To enable user interaction with system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

System 700 can include an integrated circuit 728, such as an application-specific integrated circuit (ASIC) configured to perform various operations. The integrated circuit 728 can be coupled with the connection 706 in order to communicate with other components in system 700.

The storage device 708 can include software services 710, 712, 714 for controlling the processor 704. Other hardware or software modules are contemplated. The storage device 708 can be connected to the system connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some example embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   receiving, at a controller of a network, first analytics data, the first analytics data being embedded with a watermark, the first analytics data excluding personally identifiable information associated with end points of a communication session using a cloud-based application;
   receiving, at the controller, second analytics data from one or more components of the network, the second analytics data including the watermark;
   correlating, by the controller, the first analytics data and the second analytics data using the watermark to yield correlated data; and
   performing, by the controller, network analysis and troubleshooting using the correlated data.

2. The method of claim 1, wherein the watermark includes media types associated with the communication session and a randomly generated identifier.

3. The method of claim 1, wherein the second analytics data is intercepted by the one or more components during exchange of data packets between end points of the communication session.

4. The method of claim 1, wherein
   the network is an enterprise network that operates independently from a provider of the cloud-based application, and
   the first analytics data and the second analytics data are correlated using the watermark and without sharing personally identifiable information corresponding to the end points with the provider of the cloud-based application.

5. The method of claim 1, wherein the cloud-based application provides collaboration services for use by the end points.

6. The method of claim 1, wherein correlating the first analytics data and the second analytics data comprises:
   determining that the watermark included in the first analytics data and the second analytics data match.

7. The method of claim 1, further comprising:
   determining a corresponding IP address of at least one of the end points from the second analytics data;
   determining a corresponding MAC address of the at least one of the end points based on the corresponding IP address; and
   determining a corresponding identifier of the at least one of the end points using the corresponding MAC address.

8. A controller comprising:
   memory having computer-readable instructions stored therein; and
   one or more processors configured to execute the computer-readable instructions to:
      receive first analytics data, the first analytics data being embedded with a watermark, the first analytics data excluding personally identifiable information associated with end points of a communication session using a cloud-based application;

receive second analytics data from one or more components of a network, the second analytics data including the watermark;

correlate the first analytics data and the second analytics data using the watermark to yield correlated data; and perform network analysis and troubleshooting using the correlated data.

9. The controller of claim 8, wherein the watermark includes media types associated with the communication session and a randomly generated identifier.

10. The controller of claim 8, wherein the second analytics data is intercepted by the one or more components during exchange of data packets between end points of the communication session.

11. The controller of claim 8, wherein
the network is an enterprise network that operates independently from a provider of the cloud-based application, and
the first analytics data and the second analytics data are correlated using the watermark and without sharing personally identifiable information corresponding to the end points with the provider of the cloud-based application.

12. The controller of claim 8, wherein the cloud-based application provides collaboration services for use by the end points.

13. The controller of claim 8, wherein the one or more processors are configured to execute the computer-readable instructions to correlate the first analytics data and the second analytics data by determining that the watermark included in the first analytics data and the second analytics data match.

14. The controller of claim 8, wherein the one or more processors are configured to execute the computer-readable instructions to:
determine a corresponding IP address of at least one of the end points from the second analytics data;
determine a corresponding MAC address of the at least one of the end points based on the corresponding IP address; and
determine a corresponding identifier of the at least one of the end points using the corresponding MAC address.

15. The controller of claim 8, wherein execution of the computer-readable instructions by the one or more processors cause the one or more processors to correlate the first analytics data and the second analytics data by determining that the watermark included in the first analytics data and the second analytics data match.

16. One or more non-transitory computer-readable media having computer-readable instructions stored therein, which when executed by one or more processors of a controller of a network, cause the one or more processors to:
receive first analytics data, the first analytics data being embedded with a watermark, the first analytics data excluding personally identifiable information associated with end points of a communication session using a cloud-based application;
receive second analytics data from one or more components of the network, the second analytics data including the watermark;
correlate the first analytics data and the second analytics data using the watermark to yield correlated data; and
perform network analysis and troubleshooting using the correlated data.

17. The one or more non-transitory computer-readable media of claim 16, wherein the watermark includes media types associated with the communication session and a randomly generated identifier.

18. The one or more non-transitory computer-readable media of claim 16, wherein
the network is an enterprise network that operates independently from a provider of the cloud-based application, and
the first analytics data and the second analytics data are correlated using the watermark and without sharing personally identifiable information corresponding to the end points with the provider of the cloud-based application.

19. The one or more non-transitory computer-readable media of claim 16, wherein the cloud-based application provides collaboration services for use by the end points.

20. The one or more non-transitory computer-readable media of claim 16, wherein execution of the computer-readable instructions by the one or more processors cause the one or more processors to:
determine a corresponding IP address of at least one of the end points from the second analytics data;
determine a corresponding MAC address of the at least one of the end points based on the corresponding IP address; and
determine a corresponding identifier of the at least one of the end points using the corresponding MAC address.

* * * * *